(12) United States Patent
Kim et al.

(10) Patent No.: US 9,032,111 B2
(45) Date of Patent: May 12, 2015

(54) METHOD AND APPARATUS FOR TRANSMITTING EVENT INFORMATION BETWEEN DEVICES CONNECTED WITH NETWORK, AND STORAGE MEDIUM STORING METHOD

(75) Inventors: Bong-yen Kim, Seongnam-si (KR); Jung-yon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1307 days.

(21) Appl. No.: 11/639,248

(22) Filed: Dec. 15, 2006

(65) Prior Publication Data

US 2007/0260766 A1 Nov. 8, 2007

(30) Foreign Application Priority Data

Apr. 11, 2006 (KR) ........................ 10-2006-0032786

(51) Int. Cl.
*G06F 15/177* (2006.01)
*H04L 29/08* (2006.01)
*G06F 11/30* (2006.01)
*G06F 3/06* (2006.01)
*H04L 12/28* (2006.01)

(52) U.S. Cl.
CPC .......... *H04L 67/125* (2013.01); *G06F 11/3055* (2013.01); *G06F 3/0653* (2013.01); *H04L 12/2823* (2013.01); *H04L 67/16* (2013.01); *H04L 67/14* (2013.01); *H04L 67/02* (2013.01)

(58) Field of Classification Search
CPC ........................... G06F 3/0653; G06F 11/3055
USPC ..................... 710/15, 16, 17, 18, 19
See application file for complete search history.

(56) References Cited

U.S. PATENT DOCUMENTS

| 6,167,448 | A | * | 12/2000 | Hemphill et al. | ............. | 709/224 |
|---|---|---|---|---|---|---|
| 6,910,068 | B2 | | 6/2005 | Zintel et al. | | |
| 6,910,070 | B1 | * | 6/2005 | Mishra et al. | ................. | 709/224 |
| 7,660,856 | B2 | | 2/2010 | O'Brien et al. | | |
| 2002/0112058 | A1 | * | 8/2002 | Weisman et al. | ............. | 709/227 |
| 2003/0055946 | A1 | | 3/2003 | Amemiya | | |
| 2005/0074098 | A1 | * | 4/2005 | O'Brien et al. | ............ | 379/88.12 |

FOREIGN PATENT DOCUMENTS

| EP | 1 523 165 A3 | 10/2004 |
|---|---|---|
| EP | 1 523 165 A2 | 4/2005 |

(Continued)

OTHER PUBLICATIONS

UPnP Forum, "UPnP Device Architecture 1.0, Draft Version 1.0.1", UPnP Forum, Dec. 2, 2003, pp. 1-73.*

(Continued)

*Primary Examiner* — Henry Tsai
*Assistant Examiner* — John Roche
(74) *Attorney, Agent, or Firm* — Sughrue Mion, PLLC

(57) ABSTRACT

Provided are a method and apparatus for transmitting event resources in various formats between devices connected with a network, and a storage medium storing the method. The method for transmitting event information includes determining whether a first device connected with the network receives event information from at least one second device connected with the network, and if the event information is received, allowing the first device to output an event resource on the basis of information regarding at least one event resource included in the event information.

32 Claims, 9 Drawing Sheets

(56) References Cited

FOREIGN PATENT DOCUMENTS

| | | |
|---|---|---|
| JP | 2001338380 A | 12/2001 |
| JP | 2003058437 A | 2/2003 |
| JP | 2004165754 A | 6/2004 |
| JP | 2005117637 A | 4/2005 |
| JP | 2006024048 A | 1/2006 |
| JP | 2006072952 A | 3/2006 |
| WO | WO 2005055521 A1 | 6/2005 |

OTHER PUBLICATIONS

UPnP Forum: "UPnP Device Architecture 1.0, Draft Version 1.0.1", UPnP Forum, Dec. 2, 2003, pp. 1-76, XP002458534.

Communication dated Nov. 6, 2013, issued by the European Patent Office in counterpart European Application No. 07101517.6.

Communication dated Feb. 28, 2014 issued by the State Intellectual Property Office of P.R. China in counterpart Chinese Application No. 200710084745.0.

Communication dated May 4, 2012 from the State Intellectual Property Office of P.R. China in counterpart Chinese application No. 200710084745.0.

Communication dated Aug. 14, 2012 issued by the Japanese Patent Office in counterpart Japanese Patent Application No. 2007-062434.

Communication, dated Jan. 15, 2013, issued by the European Patent Office in counterpart European Application No. 07 101 517.6.

Communication dated Sep. 13, 2011 issued by the Japanese Patent Office in counterpart Japanese Application No. 2007-62434.

* cited by examiner

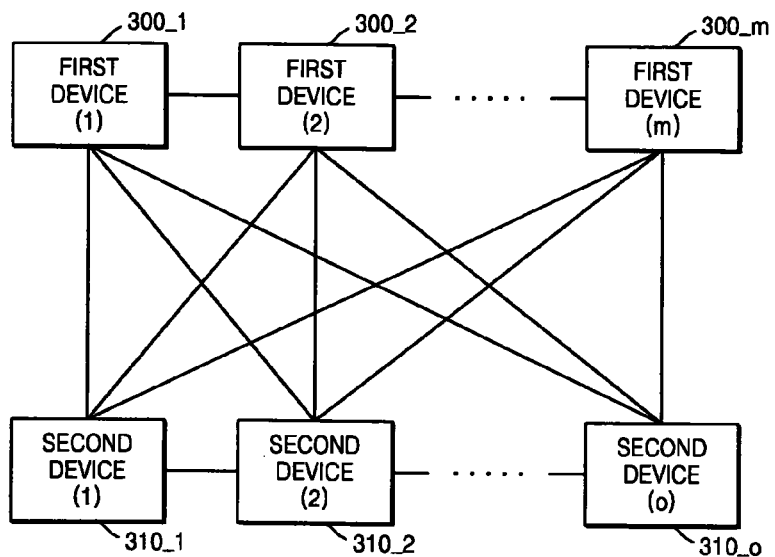
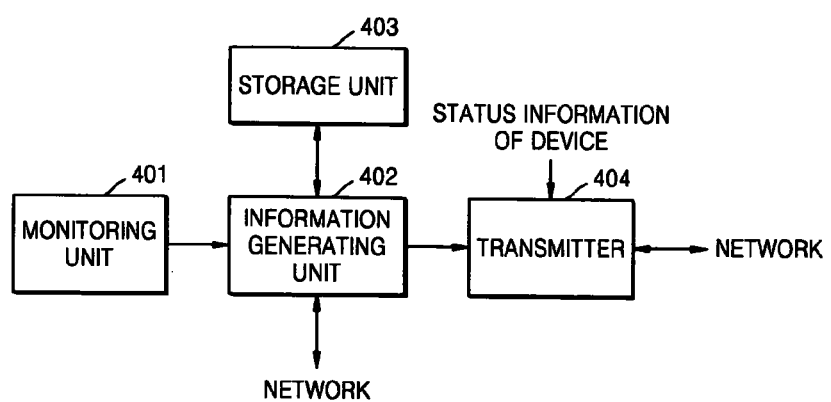

FIG. 5

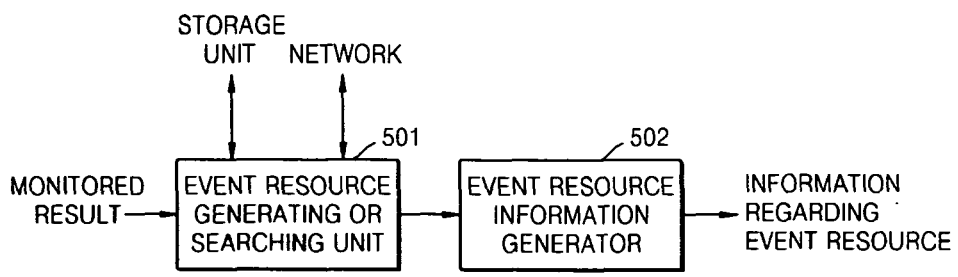

FIG. 6

```
NOTIFY delivery path HTTP/1.1
HOST:delivery host:delivery port
CONTENT-TYPE:text/xml
CONTENT-LENGTH:Bytes in body
NT:upnp:event
NTS:upnp:propchange
SID:uuid:subscription-UUID
SEQ:event key <e:propertyset xmlns:e="urn:schemas-upnp-org:event-1-0">
<e:property>                                                       610
<variableName>New Value</variableName>
<eventresource mimtype="audio/mpeg" size="1234">http://168.219.197.84:9001/alarm.mp3</eventresource>
<eventresource mimetype="image/jpeg" size="23" resolution="10*10">http://168.219.197.84:9001/alarm.jpeg</eventresource>
<eventresource mimetype="video/mpeg" size="23">http://168.219.197.84:9001/alarm.mpeg</eventresource>
</e:property>
</e:propertyset>
```

FIG. 7

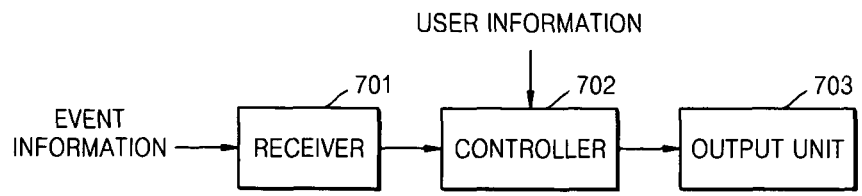

METHOD AND APPARATUS FOR TRANSMITTING EVENT INFORMATION BETWEEN DEVICES CONNECTED WITH NETWORK, AND STORAGE MEDIUM STORING METHOD

CROSS-REFERENCE TO RELATED PATENT APPLICATION

This application claims priority from Korean Patent Application No. 10-2006-0032786, filed on Apr. 11, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to event information transmission, and more particularly, to methods and apparatuses for transmitting event information between devices connected with a network, and a storage medium storing the method.

2. Description of the Related Art

A related art method of transmitting event information between devices connected with a network is a generic event notification architecture (GENA). GENA was developed for receiving and transmitting notification messages using a HyperText-Transfer Protocol (HTTP) or a multicast User-Datagram Protocol (UDP) by Transmission Control Protocol/Internet Protocol (TCP/IP).

In a universal plug and play (UPnP)-based network, when an event is generated in a specific network device, an event message is transmitted in the GENA format to a control point registered to an event source of the network device.

However, an event message transmitted in the GENA format has a simple configuration in which status information of a network device is transmitted as a string value. For example, if the network device is a digital media reproducer, status information of the digital media reproducer, such as "stop", "play", and "pause", is transmitted as a string value, using the event message. Accordingly, users can only learn of events generated by the network device in the simple format of a string value.

SUMMARY OF THE INVENTION

The present invention provides an event information transmission method and apparatus which are capable of transmitting a variety of types of event resources between devices connected with a network, and a storage medium storing the method.

The present invention also provides an event information transmission method and apparatus which are capable of transmitting event information in a multimedia format between devices connected with a network, and a storage medium storing the method.

According to an aspect of the present invention, there is provided a method for transmitting event information between devices connected with a network, including: determining whether a first device connected with the network receives event information from at least one second device connected with the network; and if the event information is received, allowing the first device to output an event resource on the basis of information regarding at least one event resource included in the event information.

According to another aspect of the present invention, there is provided a method for transmitting event information between devices connected with a network, including: monitoring whether an event is generated in a second device connected with the network; and if the event is generated, generating information regarding at least one event resource mapped to status information of a device corresponding to the generated event, and transmitting event information including the information regarding the event resource to at least one first device connected with the network.

According to another aspect of the present invention, there is provided an event information transmitting device, which is included in an apparatus for transmitting event information between devices connected with a network, including: a monitoring unit monitoring whether at least one event is generated on the basis of status information of a device; an information generating unit generating information regarding an event resource mapped to status information of the device corresponding to the generated event, if the monitoring unit determines that the at least one event is generated; and a transmitter transmitting event information including the information regarding the event resource generated by the information generating unit to at least one different device connected with the network.

According to another aspect of the present invention, there is provided an event information receiving device, which is included in an apparatus for transmitting event information between devices connected with a network, including: a receiver receiving the event information from at least one device connected with the network; an output unit outputting an event resource; and a controller controlling the output unit on the basis of information regarding at least one event resource included in the event information received from the receiver.

According to another aspect of the present invention, there is provided a computer-readable recording medium storing a computer program for executing a method for transmitting event information between devices connected with a network, the method including: determining whether a first device connected with the network receives the event information from at least one second device connected with the network; and if the event information is received, outputting from the first device an event resource on the basis of information regarding at least one event resource included in the received event information.

According to another aspect of the present invention, there is provided a computer-readable recording medium storing a computer program for executing a method for transmitting event information between devices connected with a network, the method including: monitoring whether an event is generated in a second device connected with the network; if the event is generated, generating information regarding at least one event resource mapped to status information of a device corresponding to the generated event; and transmitting event information including the information regarding the event resource to at least one first device connected with the network.

The event resource may comprise multimedia.

BRIEF DESCRIPTION OF THE DRAWINGS

The above and other aspects of the present invention will become more apparent by describing in detail exemplary embodiments thereof, with reference to the attached drawings, in which:

FIG. 3 illustrates another example of a network structure to which the event information transmission method and apparatus are applied according to an exemplary embodiment of the present invention;

FIG. 4 is a functional block diagram of an event information transmitting device included in an event information transmission apparatus for transmitting event information between devices, according to an exemplary embodiment of the present invention;

FIG. 5 is a detailed functional block diagram of an exemplary information generating unit illustrated in FIG. 4;

FIG. 6 is an exemplary view of a notification message for event information output from a transmitter illustrated in FIG. 4;

FIG. 7 is a functional block diagram of an event information receiving device included in the event information transmission apparatus for transmitting the event information between the devices, according to an exemplary embodiment of the present invention;

DETAILED DESCRIPTION OF EXEMPLARY EMBODIMENTS OF THE INVENTION

Hereinafter, exemplary embodiments according to the present invention will be described in detail with reference to the appended drawings.

Figure 1:
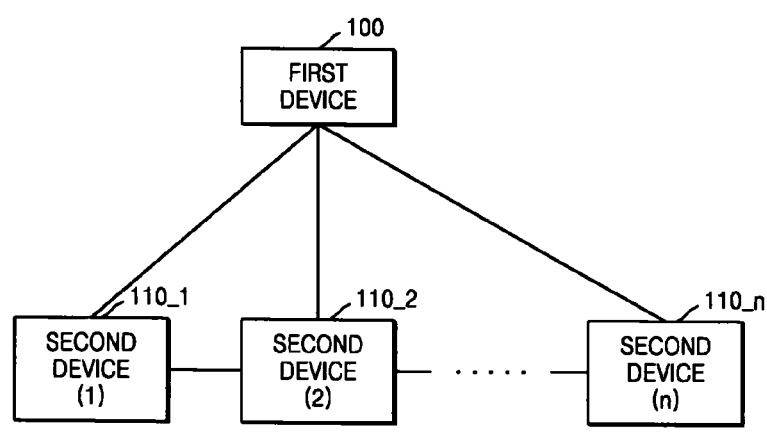
FIG. 1 illustrates an example of a network structure to which an event information transmission method and apparatus are applied according to an exemplary embodiment of the present invention.

FIG. 1 illustrates an example of a network structure to which an event information transmission method and apparatus are applied according to an exemplary embodiment of the present invention. In the network structure illustrated in FIG. 1, a control device controls a plurality of network devices.

That is, a first device 100 is a control device which controls n second devices 110_1 through 110_n. That is, the n second devices 110_1 through 110_n are devices which are controlled by the first device 100. Here, the n second devices 110_1 through 110_n may have the same function or may have different functions.

Accordingly, if the network is a UPnP-based network, the first device 100 corresponds to a control point and the n second devices 110_1 through 110_n correspond to network devices. The network devices may be printer devices, media server devices, web camera devices, etc.

The first device 100 receives event information generated by the n second devices 110_1 through 110_n, and outputs status information about the n second devices 110_1 through 110_n on the basis of the received event information and/or on the basis of at least one event resource mapped to the status information of the n second devices 110_1 through 110_n.

The at least one event resource can be defined as multimedia. The term "multimedia" as used herein refers to information or data which may include sound, video, images or graphics, text, and other forms of data, or any combination thereof. Accordingly, the first device 100 can be defined as a device for receiving event information.

If an event is generated, the n second devices 110_1 through 110_n generate event information including the status information of the n second devices 110_1 through 110_n and/or information regarding the event resource mapped to the status information, and transmit the event information to the first device 100. Accordingly, the n second devices 110_1 through 110_n can be defined as devices for transmitting event information.

In order to transmit the event information generated by the n second devices 110_1 through 110_n to the first device 100 as described above, the first device 100 should be registered to an event source on the n second devices 110_1 through 110_n. In order to register the first device 100 on the n second devices 110_1 through 110_n, the first device 100 should request an event information subscription registration from the respective n second devices 110_1 through 110_n.

When a GENA format is used, the first device 100 transmits a SUBSCRIBER message to the n second devices 110_1 through 110_n, thus requesting the event information subscription registration. The first device 100 transmits the SUBSCRIBER message to the n second devices 110_1 through 110_n in order to obtain status information of the n second devices 110_1 through 110_n. Accordingly, if the first device 100 wants to obtain status information of only certain devices of the n second devices 110_1 through 110_n, the first device 100 only need transmit the SUBSCRIBER message to the corresponding devices. Therefore, the first device 100 can receive event information generated by one or more of the n second devices 110_1 through 110_n.

After the first device 100 is registered to an event source on the n second devices 110_1 through 110_n, when the first device 100 wants to cancel an event information subscription for at least one second device among the n second devices 110_1 through 110_n, the first device 100 transmits an event information subscription cancel request message to the corresponding second device to cancel the event source registration of the corresponding second device. If the event source registration of the corresponding second device is cancelled, the corresponding second device does not transmit event information to the first device 100.

Figure 2:
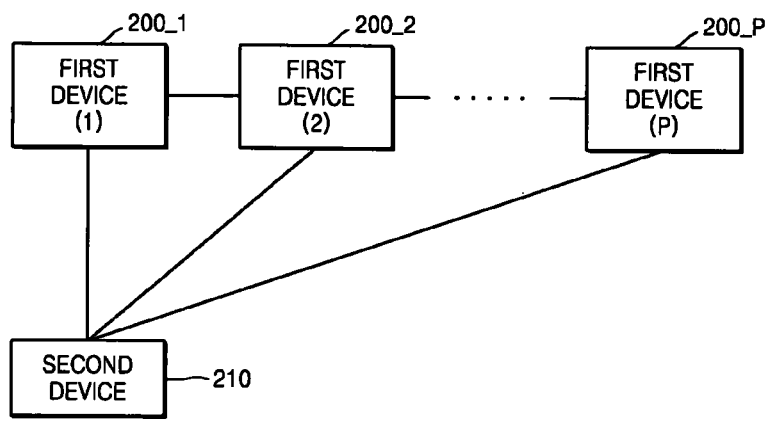
FIG. 2 illustrates another example of a network structure to which the event information transmission method and apparatus are applied according to an exemplary embodiment of the present invention.

FIG. 2 illustrates another example of a network structure to which the event information transmission method and apparatus are applied according to an exemplary embodiment of the present invention. In the network structure illustrated in FIG. 2, a plurality of control devices control a network device.

In FIG. 2, p first devices 200_1 through 200_p control a second device 210. The p first devices 200_1 through 200_p may have the same function or may have different functions.

Accordingly, if the network is a UPnP-based network, the p first devices 200_1 through 200_p correspond to control points and the second device 210 corresponds to a network device. The control points may be laptop computers, etc., and the network device may be one of a printer device, a media server device, and a web camera device, etc.

The p first devices 200_1 through 200_p receive event information generated by the second device 210, and output status information of the second device 210 based on the received event information and/or on the basis of at least one event resource, for example, multimedia, mapped to the status information of the second device 210. Accordingly, the p first devices 200_1 through 200_p can be defined as devices for receiving event information.

If an event is generated, the second device 210 generates event information including status information of the second device 210 and/or information about an event resource, for example, multimedia, mapped to the status information, and transmits the event information to the p first devices 200_1 through 200_p. Accordingly, the second device 210 can be defined as a device for transmitting event information.

In order to transmit the event information generated by the second device 210 to the p first devices 200_1 through 200_p as described above, the p first devices 200_1 through 200_p should be registered to event sources on the second device 210. In order to register the p first devices 200_1 through 200_p on the second device 210, the respective first devices 200_1 through 200_p should request an event information subscription registration from the second device 210.

When the GENA format is used, the p first devices 200_1 through 200_p transmit a SUBSCRIBER message to the second device 210, thus requesting the event information subscription registration. The p first devices 200_1 through 200_p transmit the SUBSCRIBER message to the second device 210 in order to obtain status information of the second device 210.

Accordingly, if only certain of the p first devices 200_1 through 200_p want to obtain status information of the second device 210, only those devices among the p first devices 200_1 through 200_p need transmit the SUBSCRIBER message to the second device 210. Therefore, the second device 210 can transmit the generated event information to one or more devices of the p first devices 200_1 through 200_p.

After the p first devices 200_1 through 200_p are registered to event sources on the second device 210, when at least one device of the p first devices 200_1 through 200_p wants to cancel an event information subscription for the second device 210, the corresponding first device transmits an event information subscription cancel request message to the second device 210 to cancel its event source registration. If the event source registration is cancelled, the second device 210 does not transmit event information to the corresponding first device.

FIG. 3 illustrates another example of a network structure to which the event information transmission method and apparatus are applied according to an embodiment of the present invention. In the network structure illustrated in FIG. 3, a plurality of control devices control a plurality of network devices.

In FIG. 3, m first devices 300_1 through 300_m control o second devices 310_1 through 310_o. The m first devices 300_1 through 300_m may have the same function or may have different functions. The o second devices 310_1 through 310_o may also have the same function or may have different functions.

Accordingly, if the network is a UPnP-based network, the m first devices 300_1 through 300_m correspond to control points, and the o second devices 310_1 through 310_o correspond to network devices. The control points may be laptop computers, etc., and the network devices may be printer devices, media server devices, web camera devices, etc.

The respective m first devices 300_1 through 300_m receive event information generated by the o second devices 310_1 through 310_o, and output status information of the o second devices 310_1 through 310_o on the basis of the received event information and/or on the basis of at least one event resource, for example, multimedia, mapped to the status information. Accordingly, the m first devices 300_1 through 300_m can be defined as devices for receiving event information.

If an event is generated, the o second devices 310_1 through 310_o generate event information including status information of the o second devices 310_1 through 310_o and/or information regarding at least one event resource, for example, multimedia, mapped to the status information, and transmit the event information to the m first devices 300_1 through 300_m. Accordingly, the o second devices 310_1 through 310_o can be defined as devices for transmitting event information.

In order to transmit the event information generated by the o second devices 310_1 through 310_o to the m first devices 300_1 through 300_m as described above, the m first devices 300_1 through 300_m should be registered to event sources on the o second devices 310_1 through 310_o. In order to register the m first devices 300_1 through 300_m on the o second devices 310_1 through 310_o, the m first devices 300_1 through 300_m should request an event information subscription registration from the respective o second devices 310_1 through 310_o.

When the GENA format is used, the m first devices 300_1 through 300_m transmit a SUBSCRIBER message to the o second devices 310_1 through 310_o, thus requesting the event information subscription registration. The respective m first devices 300_1 through 300_m transmit the SUBSCRIBER message to the o second devices 310_1 through 310_o in order to obtain status information of the o second devices 310_1 through 310_o.

Accordingly, when only certain devices of the m first devices 300_1 through 300_m want to obtain status information of the o second devices 310_1 through 310_o, only those first devices among the m first devices 300_1 through 300_m need transmit the SUBSCRIBER message to the o second devices 310_1 through 310_o. Therefore, the o second devices 310_1 through 310_o can transmit the generated event information to one or more devices of the m first devices 300_1 through 300_m.

When the m first devices 300_1 through 300_m want to obtain status information for certain devices of the o second devices 310_1 through 310_m, the m first devices 300_1 through 300_m need only transmit a SUBSCRIBER message to those second devices among the o second devices 210_1 through 210_o. Therefore, the m first devices 300_1 through 300_m can receive event information generated by one or more devices among the o second devices 310_1 through 310_o.

After the m first devices 300_1 through 300_m are registered to event sources on the o second devices 310_1 through 310_o, when at least one device of the m first devices 300_1 through 300_m wants to cancel an event information subscription for at least one device among the o second devices 310_1 through **310_*n*, the at least one device of the m first devices 300_1 through 300_*m* transmits an event information subscription cancel request message to the corresponding second device among the o second devices 310_1 through 310_*o***, thus canceling its event source registration. If the event source registration is cancelled, the corresponding second device does not transmit event information to the corresponding first device.

FIG. 4 is a functional block diagram of an event information transmitting device included in an event information transmission apparatus for transmitting event information between devices connected with a network, according to an exemplary embodiment of the present invention. The functional block diagram of the event information transmitting device illustrated in FIG. 4 can be viewed as a function block diagram of each second device illustrated in FIGS. 1, 2, and 3.

Referring to FIG. 4, the event information transmitting device includes a monitoring unit 401, an information generating unit 402, a storage unit 403, and a transmitter 404.

The monitoring unit 401 checks a status of a corresponding device based on status information of the corresponding device and monitors whether at least one event is generated according to the status information of the corresponding device. For example, if there is a "time variable" among the status information of the corresponding device, the monitoring unit 401 determines that an event is generated when a specific time is reached. If there is a "capture variable" among the status information of the corresponding device, the monitoring unit 401 determines that an event is generated when a user performs screen capture while watching a moving picture or a broadcast screen using the corresponding device. If there is a "function variable" among the status information of the corresponding device, the monitoring unit 401 determines that an event is generated when a function of the corresponding device changes.

If the monitoring unit 401 determines that at least one event is generated, the information generating unit 402 generates information regarding an event resource mapped to status information of the device corresponding to the generated event. At this time, if the information regarding the event resource is information regarding multimedia, the information regarding the event resource includes location information (for example, a Uniform Resource Locator (URL)) of multimedia mapped to the status information of the device corresponding to the generated event, and information on at least one attribute. The information on at least one attribute may include one or more of an event resource type, an event resource size, a reproduction period of the event resource, and a resolution of the event resource, etc.

That is, the information generating unit 402 searches for an event resource from the storage unit 403, for example, multimedia, mapped to status information of the device corresponding to the generated event, generates an event resource based on information stored in the storage unit 403, or searches for an event resource from a different network device (not shown). If an event resource, for example, multimedia, mapped to status information of the device corresponding to the generated event is searched or generated, the information generating unit 402 chooses location information, such as a URL, of a location at which the corresponding event resource exists, and information on at least one related attribute, thereby generating information regarding the event resource. If the event resource is multimedia, the information on attributes can be defined as one or more of a type of the multimedia, a size of the multimedia, a reproduction period of the multimedia, and a resolution of the multimedia.

The information generating unit 402 can be constructed as illustrated in FIG. 5. Referring to FIG. 5, the information generating unit 402 includes an event resource generating or searching unit 501 and an event resource information generator 502.

If a monitored result including a signal indicating event occurrence and status information of the device corresponding to the generated event is received from the monitoring unit 401, the event resource generating or searching unit 501 generates an event resource mapped to status information of the device corresponding to the generated event on the basis of information stored in the storage unit 403, or searches an event resource from the storage unit 403 or from a different network device (not shown). If an event resource is generated or searched, the event resource generating or searching unit 501 transmits the generated or searched event resource to the event resource information generator 502.

The event resource information generator 502 generates information related to the event resource on the basis of the generated or searched event resource. That is, the event resource information generator 502 generates location information and information on at least one attribute for the event resource. The location information for the event resource is generated based on the searched or generated result, and information on the attribute is generated based on attribute information added to the searched or generated event resource or based on attribute information set in advance. The information regarding the generated event resource is transmitted to the transmitter 404.

The storage unit 403 can store in advance event resources mapped to status information of devices corresponding to events which can be generated, or store raw data which can generate the mapped event resources when needed.

The transmitter 404 transmits event information including information related to the event resource generated by the information generating unit 402, to at least one different device connected with the network. At this time, the transmitter 404 can add the status information of the device corresponding to the generated event to the event information. The status information of the device corresponding to the event can be provided from the monitoring unit 401. The status information of the device corresponding to the event is information on the operation of the device which generates the event. For example, if the status information relates to a "time variable", the status information may be a time value. If the status information relates to a "capture variable", the status information may be a name of a captured screen. If the status information relates to a "function variable", the status information may be a name of a changed function.

An example of the event information generated by the transmitter 404 is illustrated in FIG. 6.

FIG. 6 is an exemplary view of a notification message including the event information output from the transmitter 404 illustrated in FIG. 4, wherein a tag 610 corresponding to an event resource is added to the notification message.

Referring to the tag 610 of FIG. 6, the event information generated by transmitter 404 can include status information, such as "New Value", of a device corresponding to a generated event; attribute information, such as "eventresource mimtype="audio/mpeg" size="1234""; and location information, such as http://168.219.197.84:9001, of an event resource.

FIG. 7 is a functional block diagram of an event information receiving device included in the event information transmission apparatus for transmitting the event information between the devices connected with the network, according to an embodiment of the present invention.

In the network structures illustrated in FIGS. 1, 2, and 3, the functional block diagram of each first device can be viewed as the same as illustrated in FIG. 7.

Referring to FIG. 7, the event information receiving device includes a receiver 701, a controller 702, and an outputting unit 703.

The receiver 701 receives event information from at least one device connected with the network. The event information includes status information of a device corresponding to a generated event and/or information regarding an event resource mapped to the status information of the device.

The output unit 703 outputs the event resource. If the event resource is multimedia, such as audio, video (a moving picture or a still picture), audio/video, a photo, etc., the output unit 703 can be constructed so that it can output the multimedia. The output unit 703 can further output the status information of the device corresponding to the generated event.

The controller 702 controls the output unit 703 based on information regarding at least one event resource included in the event information received from the receiver 701. The controller 702 can control the output unit 703 so that at least one of the status information of the device corresponding to the generated event, and the event resource based on the information regarding the at least one event resource is output to the output unit 703. The information regarding the at least one event resource includes location information of the event resource and attribute information.

Figure 8:
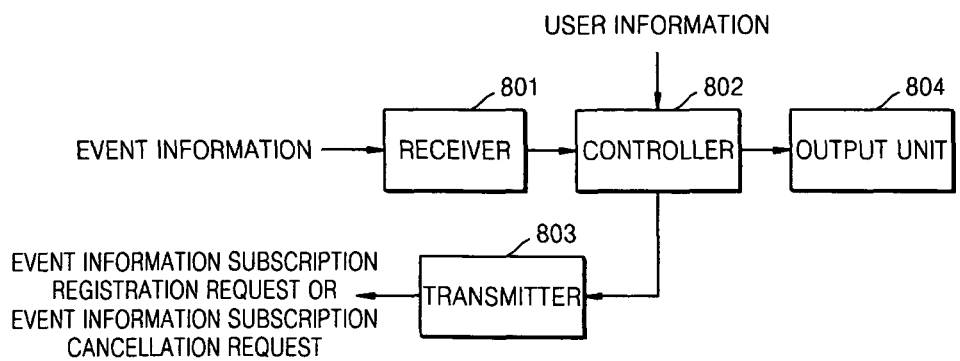
FIG. 8 is a functional block diagram of an event information receiving device included in the event information transmission apparatus for transmitting the event information between the devices, according to an exemplary embodiment of the present invention.

FIG. 8 is a functional block diagram of an event information receiving device included in the event information transmission apparatus for transmitting the event information between the devices connected with the network, according to another embodiment of the present invention.

In the network structures illustrated in FIGS. 1, 2, and 3, the functional block diagram of each first device can be viewed as the same as illustrated in FIG. 8.

Referring to FIG. 8, the event information receiving device includes a receiver 801, a controller 802, a transmitter 803, and an output unit 804.

The receiver 801 receives event information from at least one device connected with the network, for example, the receiver 701 of FIG. 7. The receiver 801 can further receive a registration notification message from the at least one device, notifying the receiver 801 that the corresponding event information receiving device is registered to an event source. In order to receive such a registration notification message, an event information subscription registration request message should be transmitted to at least one device through the transmitter 803.

If user information requesting event information subscription registration is input, the controller 802 transmits an event information subscription registration request message to at least one device connected with the network through the transmitter 803. If user information requesting event information subscription cancellation is input, the controller 803 transmits an event information subscription cancel request message to at least one device connected with the network through the transmitter 803.

If event information is received through the receiver 801, the controller 802 controls the output unit 804 and outputs an event resource, like the controller 702 of FIG. 7. If the event resource is multimedia, users can learn of the generated event via multimedia output through the output unit 804.

Figure 9:
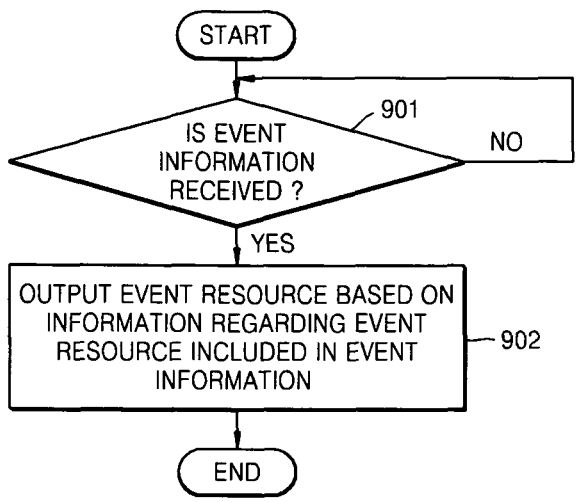
FIG. 9 is a flowchart illustrating an event information transmission method for transmitting event information between devices, according to another exemplary embodiment of the present invention.

FIG. 9 is a flowchart illustrating an event information transmission method for transmitting event information between devices connected with the network, according to a first embodiment of the present invention.

The flowchart of FIG. 9 will be described with reference to FIG. 1, as follows.

First, a first network device 100 determines whether event information is received from one or more second network devices 110_1 through 110_n (operation 901).

If event information is received, the first device 100 outputs an event resource based on information regarding at least one event resource included in the received event information (operation 902). The event resource may be multimedia. In this case, if the received event information further includes status information of a device corresponding to the generated event, the first device 100 can output the status information of the device and the at least one event resource in operation 902.

Figure 10:
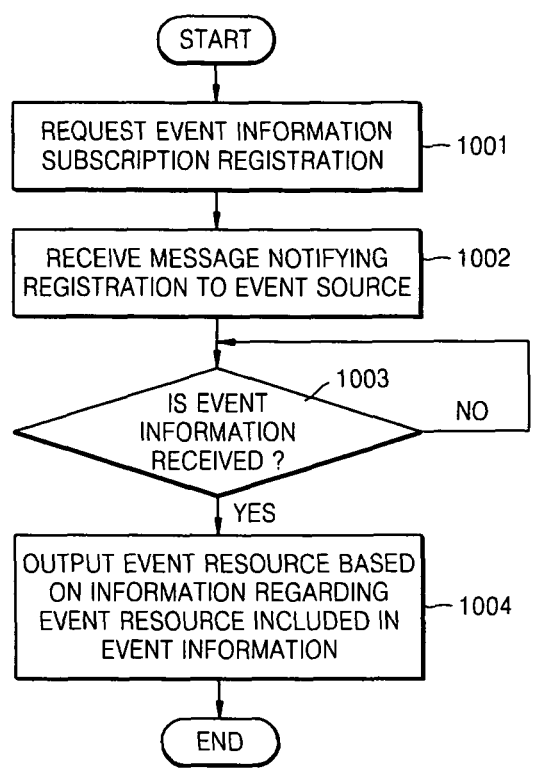
FIG. 10 is a flowchart illustrating an event information transmission method for transmitting event information between devices, according to another exemplary embodiment of the present invention.

FIG. 10 is a flowchart illustrating an event information transmission method for transmitting event information between devices connected with the network, according to another embodiment of the present invention. The flowchart of FIG. 10 will be described with reference to FIG. 1, as follows.

First, the first device 100 requests an event information subscription registration to one or more second network devices 110_1 through 110_n (operation 1001).

Then, if a registration notification message, notifying the first device 100 that it is registered to an event source, is received from the one or more second devices 110_1 through 110_n (operation 1002), the first device 100 determines whether event information is received (operation 1003).

If event information is received, the first device 100 outputs an event resource based on information regarding at least one event resource included in the received event information (operation 1004). The event resource may be multimedia. In this case, if the received event information further includes status information of a device corresponding to the generated event, the first device 110 can output the status information of the device and the at least one event resource in operation 1004.

Figure 11:
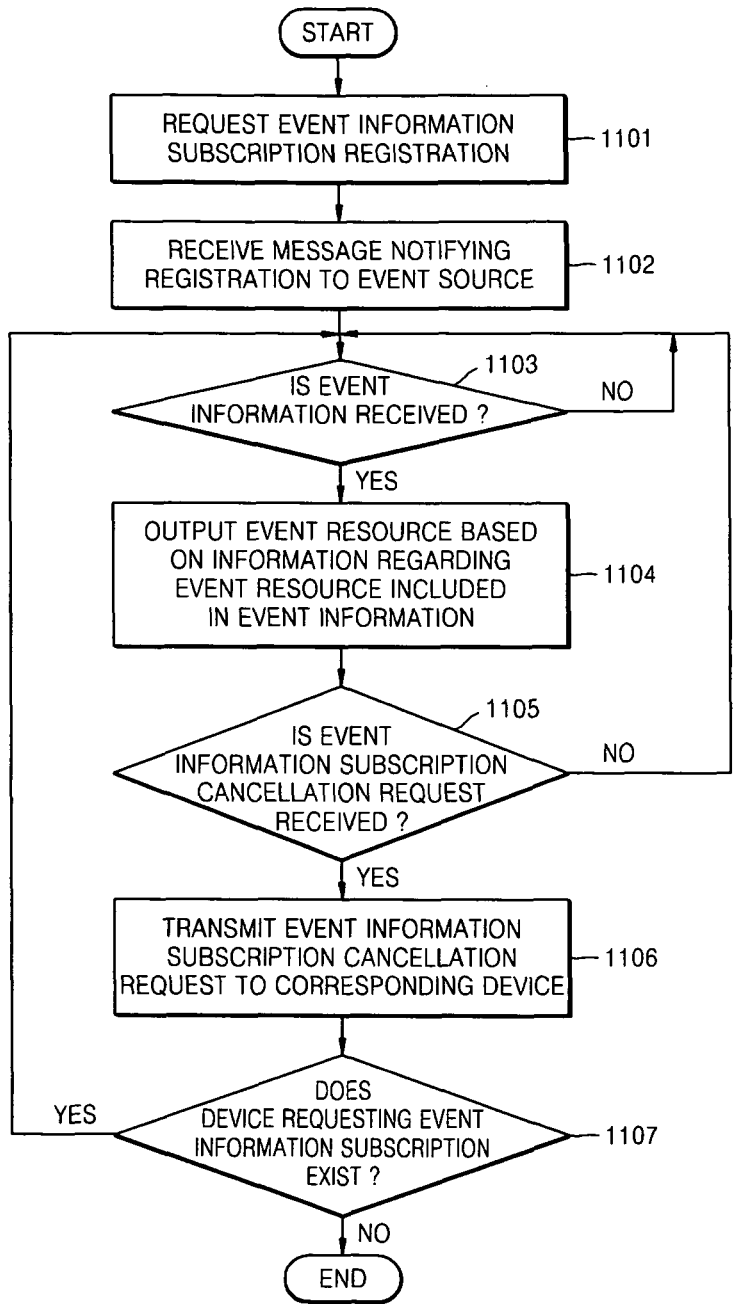
FIG. 11 is a flowchart illustrating an event information transmission method for transmitting event information between devices, according to another exemplary embodiment of the present invention.

FIG. 11 is a flowchart illustrating an event information transmission method for transmitting event information between devices connected with the network, according to another exemplary embodiment of the present invention.

In the embodiment illustrated in FIG. 11, an operation for processing an event information subscription cancel request is further included in the event information transmission method illustrated in FIG. 10. Accordingly, operations 1101 through 1104 of FIG. 11 are the same as the operations 1001 through 1004 of FIG. 10.

While a function of outputting an event resource and/or status information of a device is performed based on received event information, when an event information subscription cancellation is requested from a user (operation 1105), the first device 100 transmits an event information subscription cancel request message to the corresponding device (operation 1106). For example, if the user requests an event information subscription cancellation for the second device 110_1, the first device 100 transmits an event information subscription cancel request message to the second device 110_1.

Then, if a device requests an event information subscription, the operation of the first device 100 returns to operation 1103. However, if no device requests an event information subscription, the first device 100 terminates the function related to event information subscription.

Meanwhile, if no event information subscription cancel request is received in operation 1105, the operation of the first device 100 returns to operation 1103.

Figure 12:
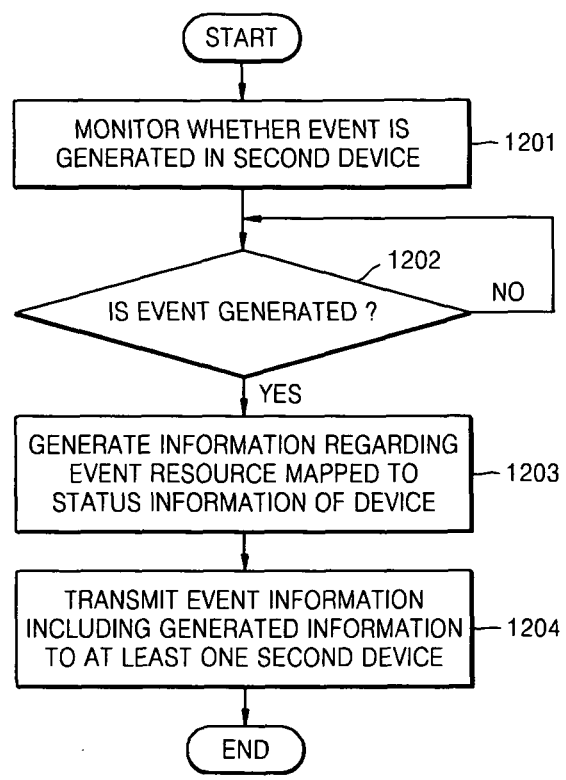
FIG. 12 is a flowchart illustrating an event information transmission method for transmitting event information between devices, according to another exemplary embodiment of the present invention.

FIG. 12 is a flowchart illustrating an event information transmission method for transmitting event information between network devices, according to another embodiment of the present invention. The flowchart illustrated in FIG. 12 will be described with reference to FIG. 2, as follows.

First, the second network device 210 monitors whether an event is generated (operation 1201). If an event is generated (operation 1202), information is generated regarding at least one event resource mapped to status information of a device corresponding to the generated event (operation 1203). The information regarding the event resource can be defined as multimedia information.

Figure 13:
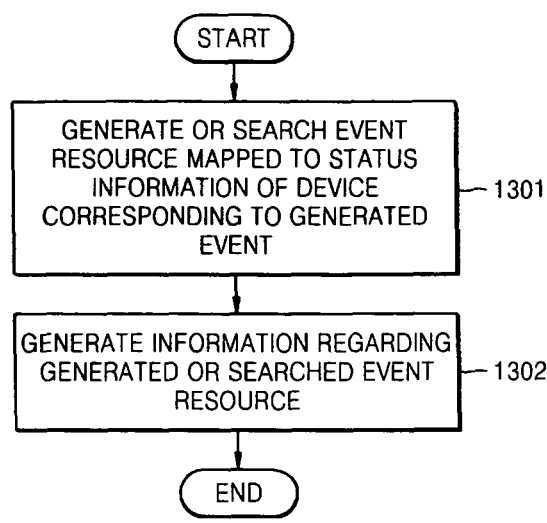
FIG. 13 is a flowchart illustrating in detail an operation of generating information regarding an event resource, illustrated in FIG. 12.

FIG. 13 is a flowchart illustrating in detail the generation of the information regarding the event resource (operation 1203), illustrated in FIG. 12. Referring to FIG. 13, an event resource mapped to the status information of the device corresponding to the generated event is generated or searched (operation 1301). The generation and search of the event resource are described above with reference to FIG. 5.

The information regarding the event resource is generated based on the generated or searched event resource (operation 1302). The information regarding the event resource includes location information of the event resource and attribute information. The attribute information is described above.

Then, referring to FIG. 12, event information including the information regarding the event resource is transmitted to one or more first network devices 200_1 through 200_p (operation 1204). Here, the event information can further include status information of the device corresponding to the generated event. The information regarding the at least one event resource can be chosen according to the status information of the device corresponding to the generated event. For example, if the status information of the device relates to an image, the event resource is chosen to be an image or video. If the status information of the device relates to audio, the event resource is chosen to be audio.

Figure 14:
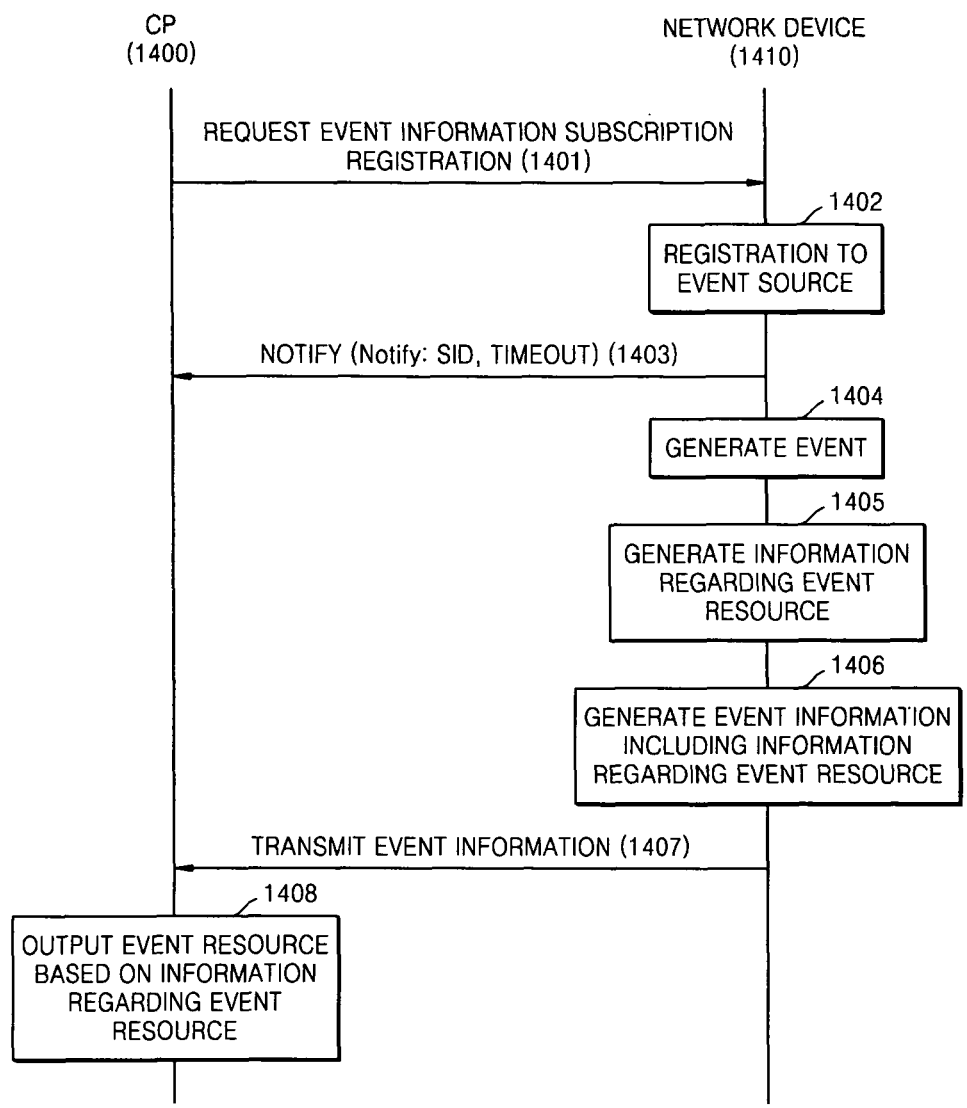
FIG. 14 is a flowchart illustrating a method for transmitting event information between devices connected through the universal plug and play (UPnP)-based network, according to an exemplary embodiment of the present invention.

FIG. 14 is a flowchart illustrating a method for transmitting event information between devices connected through a UPnP-based network, according to an embodiment of the present invention.

Referring to FIG. 14, if a control point (CP) 1400 corresponding to the first device in the above embodiments requests an event information subscription registration to a network device 1410 (operation 1401), the network device 1410 registers the CP 1400 to an event source (operation 1402), and transmits a message to the CP 1400 notifying the CP 1400 that it is registered to an event source (operation 1403).

At this time, the network device 1410 further transmits to the CP 1400 a unique security identifier (SID) assigned to the CP 1400 and time information, such as a timeout, regarding a time duration during which a user can subscribe to corresponding event information. Accordingly, the CP 1400 is subscribed to event information generated by the network device 1410 on the basis of the assigned SID and time information. If the time duration provided by the network device 1410 elapses, the CP 1400 can maintain the event information subscription registration by transmitting a RESUBSCRIBE message to periodically request an event information subscription registration from the network device 1410.

If an event is generated in the network device 1410 (operation 1404), the network device 1410 generates information regarding an event resource mapped to status information of a device corresponding to the generated event (operation 1405).

Then, the network device 1410 generates event information including information regarding the event resource (operation 1406), and transmits the generated event information to the CP 1400 (operation 1407). The CP 1400 outputs an event resource on the basis of the information regarding the event resource (operation 1408).

A program for executing a method for transmitting event information between devices connected with a network, according to an exemplary embodiment of the present invention, can also be implemented as computer readable code on a computer readable recording medium. The computer readable recording medium is any data storage device that can store data which can be thereafter read by a computer system. Examples of computer readable recording medium include read-only memory (ROM), random-access memory (RAM), CD-ROM, magnetic tape, floppy disk, and optical data storage device. The computer readable recording medium can also be distributed over network coupled computer systems so that the computer readable code is stored and executed in a distributed fashion.

According to an exemplary embodiment of the present invention, if an event is generated by at least one network device, status information of the device according to the generated event and/or at least one event resource mapped to the status information of the device are transmitted to a device (for example, a control point) registered to an event source, so that a user can recognize the event generated by the network device in various formats.

For example, if the event resource mapped to the status information of the device according to the generated event is multimedia such as video or an image, a user can visually learn of the generated event through the displayed video or image. Also, if the event resource mapped to the status information of the device according to the generated event is in a medium such as audio, a user can aurally learn of the generated event through the audio output. Further, if the event resource mapped to the status information of the device according to the generated event is multimedia in which audio and video are combined, a user can visually and aurally learn of the generated event through the video and audio output.

While the present invention has been described and shown in particularity with reference to exemplary embodiments thereof, it will be understood by those of ordinary skill in the art that various changes in form and details may be made therein without departing from the spirit and scope of the present invention as defined by the following claims.

What is claimed is:

1. A method for transmitting event information between devices connected with a network, the method comprising:
   determining whether a first device connected with the network receives event information from at least one second device connected with the network;
   if the event information is received, outputting from the first device at least one status information of the at least one second device included in the event information and at least one event resource, the outputting of the at least one event resource being based on information regarding the at least one event resource, the at least one event resource being mapped to the status information of the at least one second device corresponding to at least one event included in the event information, wherein the event is generated according to the status information of the at least one second device,
   wherein the information regarding the at least one event resource comprises location information of the at least one event resource and at least one attribute information of the at least one event resource, and
   wherein the first device receives time information from the at least one second device indicating a time duration during which the first device is allowed to receive the event information from the at least one second device.

2. The method of claim 1, wherein the at least one event resource comprises multimedia.

3. The method of claim 2, further comprising:
requesting at the first device an event information subscription registration from the at least one second device; and
if the first device receives a notification that the first device is registered to an event source from the at least one second device, determining at the first device whether the first device receives the event information from the at least one second device.

4. The method of claim 2, wherein the first device is a control device which controls the at least one second device, and the at least one second device is a device which is controlled by the first device.

5. The method of claim 1, further comprising:
requesting at the first device an event information subscription registration from the at least one second device; and
if the first device receives a notification that the first device is registered to an event source from the at least one second device, determining at the first device whether the first device receives the event information from the at least one second device.

6. The method of claim 1, wherein the first device is a control device which controls the at least one second device, and the at least one second device is a device which is controlled by the first device.

7. A method for transmitting event information between devices connected with a network, the method comprising:
monitoring whether at least one event is generated in a device connected with the network, wherein the event is generated according to the status information of the device;
if the at least one event is generated, generating information regarding at least one event resource, the at least one event resource being mapped to the status information of the device corresponding to the at least one event; and
transmitting event information including the status information of the device and the information regarding the at least one event resource to at least one different device connected with the network,
wherein the information regarding at least one event resource includes location information of the at least one event resource and at least one attribute information of the at least one event resource, and
wherein the at least one different device receives time information from the device indicating a time duration during which the at least one different device is allowed to receive the event information from the device.

8. The method of claim 7, wherein the event resource comprises multimedia.

9. The method of claim 8, wherein the information regarding the at least one event resource is determined according to the status information of the device corresponding to the at least one event.

10. The method of claim 8, wherein the at least one different device is registered to an event source on the device.

11. The method of claim 8, wherein the at least one different device is a control device which controls the device, and the device is a device which is controlled by the at least one different device.

12. The method of claim 8, wherein, if the network is a universal plug and play (UPnP)-based network, the at least one different device is a control point and the device is a network device.

13. The method of claim 8, wherein the generating of the information regarding the event resource comprises:
generating or searching for the event resource mapped to the status information of the device corresponding to the at least one event; and
generating the information regarding the event resource based on the event resource.

14. An event information transmitting device, which is included in an apparatus for transmitting event information between devices connected with a network, the event information transmitting device comprising:
a monitoring unit which monitors whether at least one event is generated based on status information of a device, wherein the event is generated according to the status information of the device;
an information generating unit which generates information regarding at least one event resource, the at least one resource being mapped to the status information of the device corresponding to the at least one event, if the monitoring unit determines that the at least one event is generated; and
a transmitter which transmits event information comprising the status information of the device and the information regarding the at least one event resource generated by the information generating unit to at least one different device connected with the network,
wherein the information regarding the event resource comprises location information of the event resource and at least one attribute information of the at least one event resource, and
wherein the transmitter transmits time information to the at least one different device indicating a time duration during which the at least one different device is allowed to receive the event information.

15. The event information transmitting device of claim 14, wherein the event resource comprises multimedia.

16. The event information transmitting device of claim 15, wherein the information generating unit comprises:
an event resource generating or searching unit which generates or searches for the event resource mapped to the status information of the device; and
an event resource information generator which generates the information regarding the event resource on the basis of the event resource.

17. The event information transmitting device of claim 15, wherein
the at least one different device is registered to an event source on the event information transmitting device.

18. The event information transmitting device of claim 15, wherein, if the network is a universal plug and play (UPnP)-based network, the event information transmitting device is a network device which is controlled by a control point.

19. An event information receiving device, which is included in an apparatus for transmitting event information between devices connected with a network, the event information receiving device comprising:
a receiver which receives the event information from at least one device connected with the network;
an output unit which outputs at least one status information of the at least one device included in the event information and at least one event resource, wherein the output unit outputs the at least one event resource based on information regarding the at least one event resource, the at least one event resource being mapped to the status information of the at least one device corresponding to at least one event included in the event information, and wherein the event is generated according to the status information of the at least one device; and a controller which controls the output unit based on the at least one status information of the at least one device and the information regarding at least one event resource included in the event information received from the receiver, wherein the at least one event resource corresponds to at least one event, and wherein the information regarding the at least one event resource comprises location information of the at least one event resource and at least one attribute information of the at least one event resource, and wherein the receiver receives time information from the at least one device indicating a time duration during which the receiver is allowed to receive the event information from the at least one device.

20. The event information receiving device of claim 19, wherein the event resource comprises multimedia.

21. The event information receiving device of claim 20, further comprising a transmitter which transmits an event information subscription registration request message or an event information subscription cancel request message to the at least one device;

wherein the receiver further receives from the at least one device a notification that the event information receiving device is registered to an event source.

22. The event information receiving device of claim 20, wherein, if the network is a universal plug and play (UPnP)-based network, the event information receiving device is a control point.

23. A non-transitory computer-readable recording medium storing a computer program for executing a method for transmitting event information between devices connected with a network, the method comprising:

determining whether a first device connected with the network receives the event information from at least one second device connected with the network; and if the event information is received, outputting from the first device at least one status information of the at least one second device included in the event information and at least one event resource, the outputting of the at least one event resource being based on information regarding the at least one event resource, the at least one event resource being mapped to the status information of the at least one second device corresponding to at least one event included in the received event information, wherein the event is generated according to the status information of the at least one second device, wherein the information regarding the at least one event resource comprises location information of the at least one event resource and at least one attribute information of the at least one event resource, and wherein the first device receives time information from the at least one second device indicating a time duration during which the first device is allowed to receive the event information from the at least one second device.

24. A non-transitory computer-readable recording medium storing a computer program for executing a method for transmitting event information between devices connected with a network, the method comprising:

monitoring whether an event is generated in a second device connected with the network, wherein the event is generated according to the status information of the device;

if the event is generated, generating information regarding at least one event resource, the at least one event resource being mapped to the status information of a device corresponding to the event; and transmitting event information including the status information of the device and the information regarding the event resource to at least one first device connected with the network, wherein the information regarding at least one event resource includes location information of the at least one event resource and at least one attribute information of the at least one event resource, and wherein the at least one first device receives time information from the second device indicating a time duration during which the at least one first device is allowed to receive the event information from the second device.

25. The event information transmitting device of claim 15, wherein the event resource comprises at least one of video, image, and audio data.

26. The event information transmitting device of claim 14, wherein the location information of the event resource comprises a URL.

27. The method of claim 1, wherein if the time duration elapses, the first device can maintain the event information subscription by transmitting a message to request an event information subscription registration from the at least one second device.

28. The method of claim 7, wherein if the time duration elapses, the at least one different device can maintain the event information subscription by transmitting a message to request an event information subscription registration from the device.

29. The event information transmitting device of claim 14, wherein if the time duration elapses, the at least one different device can maintain the event information subscription by transmitting a message to request an event information subscription registration from the event information transmitting device.

30. The event information receiving device of claim 19, wherein if the time duration elapses, the event information subscription can be maintained by transmitting a message to request an event information subscription registration from the at least one device.

31. The computer-readable recording medium of claim 23, wherein if the time duration elapses, the first device can maintain the event information subscription by transmitting a message to request an event information subscription registration from the at least one second device.

32. The computer-readable recording medium of claim 24, wherein if the time duration elapses, the at least one first device can maintain the event information subscription by transmitting a message to request an event information subscription registration from the second device.

* * * * *